United States Patent
Lee

(10) Patent No.: US 9,281,859 B1
(45) Date of Patent: Mar. 8, 2016

(54) SMARTPHONE COVER MODULE WITH EMBEDDED GAME CONTROLLER

(71) Applicant: Eun-Ml Lee, Gyeonggi-do (KR)

(72) Inventor: Eun-Ml Lee, Gyeonggi-do (KR)

( * ) Notice: Subject to any disclaimer, the term of this patent is extended or adjusted under 35 U.S.C. 154(b) by 0 days.

(21) Appl. No.: 14/632,840

(22) Filed: Feb. 26, 2015

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
CPC .............................. A63F 13/02; H04B 1/3888
USPC ............... 463/36, 37; 455/556.1, 575.8, 90.2, 455/90.3
See application file for complete search history.

(56) References Cited

U.S. PATENT DOCUMENTS

| | | | | |
|---|---|---|---|---|
| 6,530,838 B2 * | 3/2003 | Ha | .......................... | A63F 13/06 345/169 |
| D720,342 S * | 12/2014 | Starrett | ........................ | D14/252 |
| 9,138,640 B2 * | 9/2015 | Baum | ....................... | A63F 13/02 |
| 2010/0081505 A1* | 4/2010 | Alten | ....................... | A63F 13/02 463/36 |
| 2013/0184077 A1* | 7/2013 | Galpern | .................. | A63F 13/02 463/37 |
| 2014/0179437 A1* | 6/2014 | King | ....................... | A63F 13/02 463/37 |

* cited by examiner

*Primary Examiner* — Sonny Trinh
(74) *Attorney, Agent, or Firm* — Muncy, Geissler, Olds & Lowe, P.C.

(57) ABSTRACT

Disclosed herein is a smartphone cover module with an embedded game controller. The smartphone cover module includes a smartphone cover provided to protect a surface of a smartphone, with a through hole formed to expose the surface of the smartphone. A direction button is formed on the through hole of the smartphone cover and made of a conductive material. A direction-change support is formed into a shape of a pole that extends downwards from a central portion of a lower surface of the direction button, and spaces the direction button apart from the surface of the smartphone. A button restoring pad connects the direction button or the direction-change support to the smartphone cover, and is formed into a shape of a pad made of an elastic material, thus restoring the direction button from an inclined state to an original state.

19 Claims, 27 Drawing Sheets

SMARTPHONE COVER MODULE WITH EMBEDDED GAME CONTROLLER

BACKGROUND OF THE INVENTION

1. Field of the Invention

The present invention relates, in general, to a smartphone cover module and, more particularly, to a smartphone cover module with an embedded game controller, which is configured to provide a physical button for use during a game, thus improving a manipulation sensation.

2. Description of the Related Art

A smartphone is a mobile electronic device with functions of a touchscreen-based mobile phone, a camera, a mobile internet connection, a video player, etc. Currently, the smartphone is widely used throughout the world. Examples of representative products are iPhones of Apple Inc. of USA, and Android phones manufactured by the American internet search engine company, Google.

The most important feature of these devices is the use of a touchscreen using the fingers. The devices also have a data communication function using Wi-Fi as well as a voice call function. In light of these features, the smartphone enables games to be easily downloaded using an application store or the like, and thereby allows a user to enjoy various games.

However, since an input operation should be performed by a virtual button that is shown on a front touchscreen so as to manipulate a game, it is difficult to rapidly and precisely perform the input operation; additionally a user cannot experience a desirable grip sensation.

Conventional smartphone game controllers are typically classified into two types, an independent type controller utilizing Bluetooth technology and a sheet type controller attached to an LCD of a smartphone. However, the controller utilizing Bluetooth technology is problematic in that additional power is required, so that it is impossible to use the controller unless power is supplied to the controller. Additionally, a user should possess the controller separately from the smartphone, so that it is inconvenient to use.

Further, the sheet type controller attached to the LCD of the smartphone does not require additional power supply, but is poor in appearance when it is used for a general smartphone operation instead of for a game. Moreover, this is problematic in that it makes difficult to use a touch user interface (UI) of a smartphone application, and the controller should be separately stored when it is detached from the LCD, thus causing an inconvenience to a user.

Further, a conventional game pad formed of a PCB substrate fundamentally has no button for processing a diagonal signal on a direction button. That is, in order to process the diagonal signal, a user simultaneously presses two buttons among up-and-down or left-and-right buttons to combine the directions of the two buttons with each other. As such, since the two buttons are simultaneously pressed to process the diagonal signal, the diagonal direction may not be perceived if one of the two direction buttons is incorrect. As a result, mistakes may occur during the game.

SUMMARY OF THE INVENTION

Accordingly, the present invention has been made keeping in mind the above problems occurring in the related art, and the present invention is intended to propose a smartphone cover module with an embedded game controller, which is normally utilized as a smartphone cover for protecting a smartphone and serves as a dedicated controller during a game, thus improving a manipulation sensation when playing a mobile game for the smartphone.

Further, the present invention is intended to propose a smartphone cover module with an embedded game controller, in which it is possible to perform a diagonal-signal input operation, without making any mistakes, when a direction button is manipulated during a game, and additionally, it is possible to precisely control even a diagonal direction at various angles.

Furthermore, the present invention is intended to propose a smartphone cover module with an embedded game controller, in which it is possible to control an intensity of a change in direction depending on an extent of movement in a moving direction when a direction button is manipulated during a game.

Objects to be accomplished by the present invention are not limited to the above-mentioned objects, and other objects will become evident to those skilled in the art from the following description.

In order to achieve the above objects, according to one aspect of the present invention, there is provided a smartphone cover module with an embedded game controller, including a smartphone cover provided to protect a surface of a smartphone, with a through hole formed to expose the surface of the smartphone; a direction button formed on the through hole of the smartphone cover, and made of a conductive material; a direction-change support formed into a shape of a pole that extends downwards from a central portion of a lower surface of the direction button, and spacing the direction button apart from the surface of the smartphone; and a button restoring pad connecting the direction button or the direction-change support to the smartphone cover, and formed into a shape of a pad made of an elastic material, thus restoring the direction button from an inclined state to an original state, wherein, when a point on an upper surface of the direction button in a front-rear direction, a left-right direction, or a diagonal direction is pressed by an external force, the direction button is inclined with respect to the direction-change support and thereby transmits a direction signal to a point on the surface of the smartphone.

Further, the button restoring pad may have the same shape as a through hole of the smartphone cover and may be formed of a conductive material, an end thereof being connected to an inner surface of the through hole of the smartphone cover, a lower surface thereof being in close contact with the surface of the smartphone, and a central portion of an upper surface thereof being connected to a lower end of the direction-change support, thus elastically supporting an inclination of the direction-change support, the direction-change support may be made of an insulating material and an elastic material and may serve as a reference point for the inclination of the direction button on the upper surface of the button restoring pad, and the direction button may be in contact with a point on the upper surface of the button restoring pad, thus transmitting the direction signal to the point on the surface of the smartphone.

Further, the button restoring pad may be formed at a first end thereof along a side surface of the direction button and formed at a second end thereof along a side surface of the through hole of the smartphone cover, thus elastically supporting an inclination of the direction button, the direction-change support may be made of an insulating material and a hard material, a lower end of the direction-change support being in contact with the surface of the smartphone cover, thus serving as a reference point for the inclination of the direction button, and the direction button may be in direct contact with the point on the surface of the smartphone.

According to one aspect of the present invention, there is provided a smartphone cover module with an embedded game controller, including a smartphone cover provided to protect a surface of a smartphone, with a through hole formed to expose the surface of the smartphone; a direction button formed on the through hole of the smartphone cover in such a way as to be movable in a front-rear direction, a left-right direction, or a diagonal direction; a spacing support formed into a shape of a pole that extends downwards from a central portion of a lower surface of the direction button, and spacing the direction button apart from the surface of the smartphone; a direction-change pad connected to a lower end of the spacing support, coming into contact with the surface of the smartphone, and moving on the surface of the smartphone in conjunction with a movement of the direction button; and a button restoring part provided on a side surface of any one of the direction button, the spacing support and the direction-change pad, and made of an elastic material, and restoring the direction button from a moved position to a center of the through hole of the smartphone cover, wherein the direction button, the spacing support, and the direction-change pad are made of a conductive material, so that, when a point on an upper surface of the direction button in a front-rear direction, a left-right direction, or a diagonal direction is pressed by an external force, the direction-change pad is moved in an associated direction and both a direction signal and an intensity signal are transmitted to a point on the surface of the smartphone.

Further, the button restoring part may be formed at a first end thereof along a side surface of the direction-change pad and formed at a second end thereof along a side surface of the through hole of the smartphone cover, thus elastically supporting a movement of the direction-change pad.

Further, the button restoring part may be formed at a first end thereof along a side surface of the spacing support and formed at a second end thereof along a side surface of the through hole of the smartphone cover, thus elastically supporting a movement of the direction-change pad.

Further, the button restoring part may be made of an elastic material of either of a ring-shaped spring or a rubber band to surround side surfaces of the spacing support and the direction-change pad, and the through hole of the smartphone cover may be provided with a locking protrusion that is downwardly bent, thus locking the button restoring part of the spring or the rubber band to a center of the through hole and thereby elastically supporting a movement of the direction-change pad.

Further, the direction-change pad may be made of a transparent material to expose the surface of the smartphone displaying a direction image to an outside.

Further, the direction button may be formed into any one of a circular shape, an elliptical shape, a polygonal shape and a cross shape.

Further, the smartphone cover may include, on a front surface thereof, the direction button and a selector button provided adjacent to the direction button; and may include, on a rear surface thereof, a screen display window having the same size as a screen of the smartphone and exposing the screen to an outside, and at normal times, the rear surface of the smartphone cover may be mounted to correspond to the screen provided on a front of the smartphone; while during a game, the front surface of the smartphone cover may be mounted to correspond to the screen provided on the front of the smartphone.

Further, the smartphone cover may include, on a front surface thereof, the direction button and a selector button provided adjacent to the direction button, the smartphone cover being formed into a shape of a flip cover that is rotatable at a front surface thereof.

The smartphone cover module may further include a game display window provided on the front surface of the smartphone cover to expose the screen of the smartphone during the game.

As is apparent from the above description, the smartphone cover module with the embedded game controller is advantageous in that it can be used as a game pad during the game and be normally utilized as a smartphone cover which is easy to carry with.

Further, the smartphone cover module with the embedded game controller is advantageous in that it is provided with the physical button, thus forming a step with a surface of the smartphone cover, and thereby improving the manipulation sensation of the mobile game for the smartphone.

Furthermore, the smartphone cover module with the embedded game controller is advantageous in that a signal processing portion is composed of a touchscreen and an application program of the smartphone, so that it is possible to directly process the diagonal direction signal.

That is, the conventional game pad has only four direction key buttons at upper and lower positions and left and right positions, so that the diagonal direction is processed by combining two neighboring buttons with each other. By contrast, according to the present invention, the diagonal direction is processed by a program in the smartphone, so that it is possible to freely process eight directions, including front and rear directions, left and right directions, and diagonal directions. Moreover, it is possible to precisely control the diagonal direction at various angles.

Further, the smartphone cover module with the embedded game controller is advantageous in that it is possible to control the intensity of the change in direction depending on the extent of movement in the moving direction when the direction button is manipulated during the game.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

The detailed description of the present invention, including the object of the invention and the effect of the invention, will follow with reference to embodiments and drawings. These and other features, aspects, and advantages of the present invention and means for accomplishing them will become evident to those skilled in the art from a reading of embodiments which will be described below in conjunction with the accompanying drawings.

Hereinbelow, the present invention will be described in more detail with reference to the drawings.

First Embodiment

Figure 1:
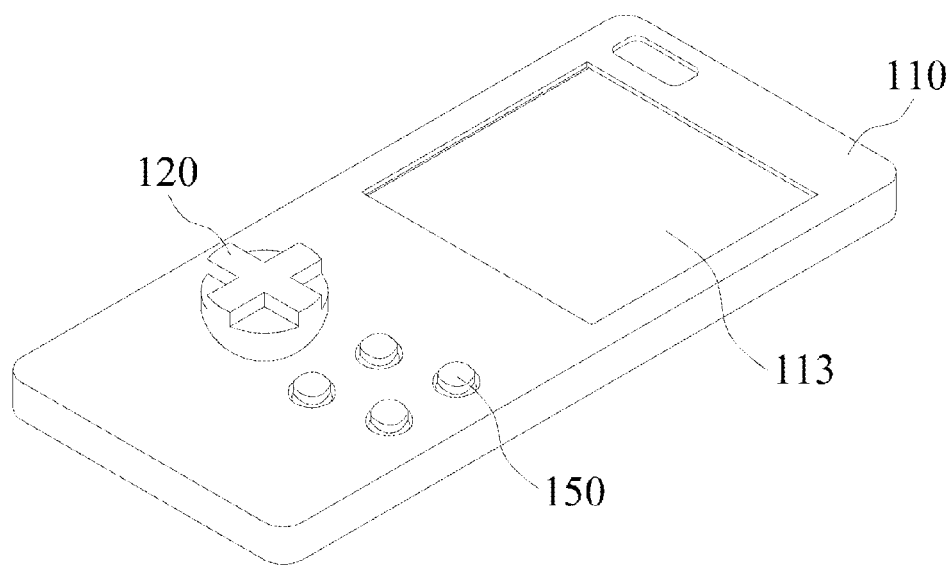
FIG. 1 is a perspective view showing a smartphone cover module with an embedded game controller according to a first embodiment of the present invention when viewed from a front.
Figure 2:
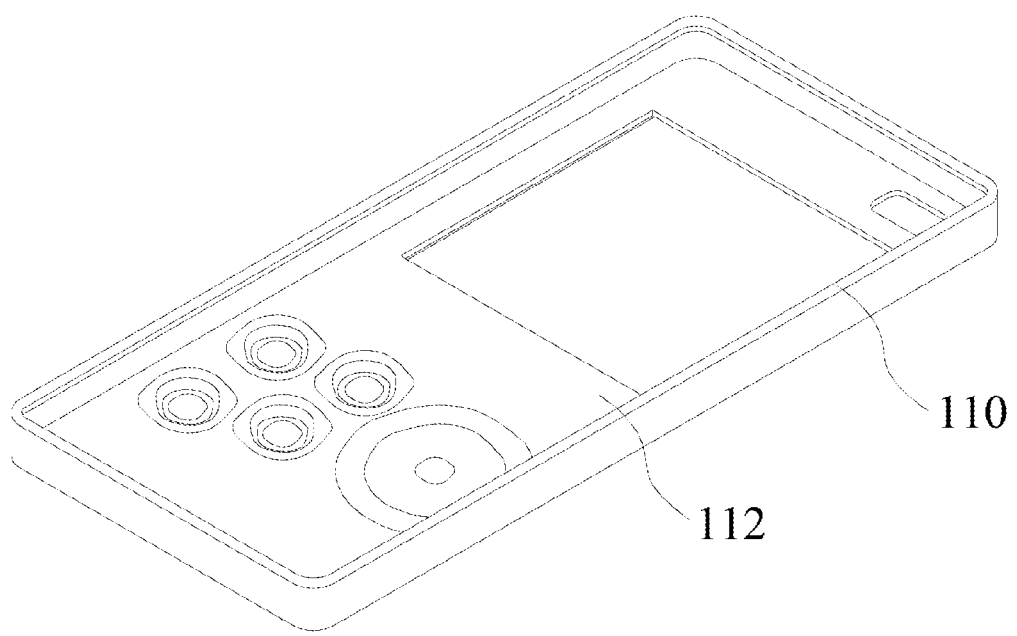
FIG. 2 is a perspective view showing the smartphone cover module with the embedded game controller according to the first embodiment of the present invention when viewed from a rear.
Figure 3:
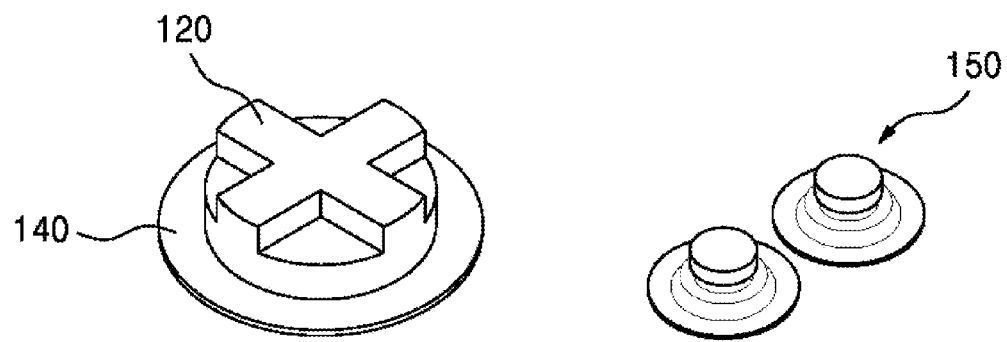
FIG. 3 is a perspective view showing a direction button and a selector button of the smartphone cover module with the embedded game controller according to the first embodiment of the present invention when viewed from above.
Figure 4:
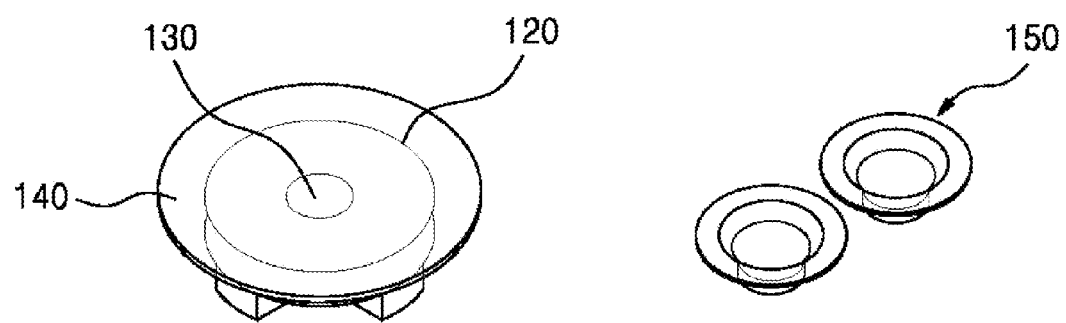
FIG. 4 is a perspective view showing the direction button and the selector button of the smartphone cover module with the embedded game controller according to the first embodiment of the present invention when viewed from below.
Figure 5:
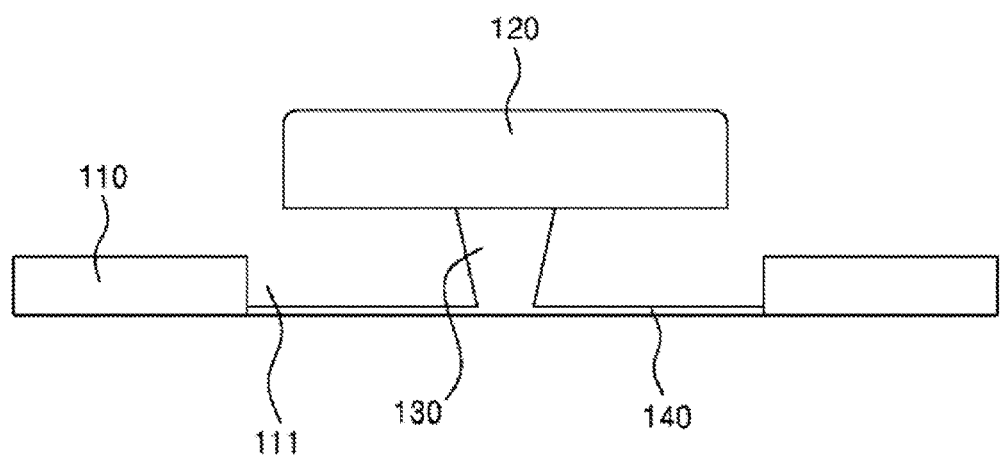
FIG. 5 is a sectional view showing the direction button of the smartphone cover module with the embedded game controller according to the first embodiment of the present invention.
Figure 6:
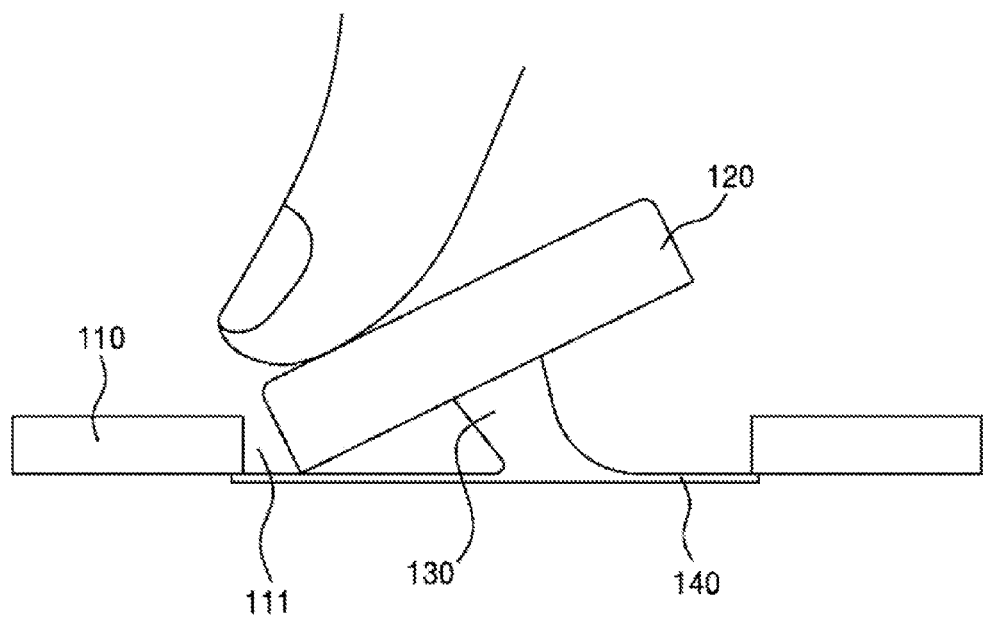
FIG. 6 is a sectional view showing an operation of the direction button of the smartphone cover module with the embedded game controller according to the first embodiment of the present invention.

FIGS. 1 to 6 are views illustrating a smartphone cover module with an embedded game controller according to a first embodiment of the present invention. To be more specific, FIG. 1 is a perspective view showing the smartphone cover module with the embedded game controller according to the first embodiment of the present invention when viewed from a front, FIG. 2 is a perspective view showing the smartphone cover module with the embedded game controller according to the first embodiment of the present invention when viewed from a rear, FIG. 3 is a perspective view showing a direction button and a selector button of the smartphone cover module with the embedded game controller according to the first embodiment of the present invention when viewed from above, FIG. 4 is a perspective view showing the direction button and the selector button of the smartphone cover module with the embedded game controller according to the first embodiment of the present invention when viewed from below, FIG. 5 is a sectional view showing the direction button of the smartphone cover module with the embedded game controller according to the first embodiment of the present invention, and FIG. 6 is a sectional view showing an operation of the direction button of the smartphone cover module with the embedded game controller according to the first embodiment of the present invention.

As shown in FIGS. 1 to 6, the smartphone cover module with the embedded game controller according to the first embodiment of the present invention includes a smartphone cover 110, a direction button 120, a direction-change support 130, and a button restoring pad 140.

The smartphone cover 110 is provided to protect a surface of a smartphone, with a through hole 111 formed to expose the surface of the smartphone. To be more specific, referring to FIGS. 1 and 2, the smartphone cover 110 has on a front surface thereof a direction button 120, and a selector button 150 provided to be adjacent to the direction button 120. Further, the smartphone cover 110 has on a rear surface thereof a screen display window 112 that has the same size as a screen of the smartphone and exposes the screen to an outside.

Through such a configuration, at normal times, the rear surface of the smartphone cover 110 is mounted to correspond to the screen provided on a front of the smartphone so as to be used as a general pad, and while during a game, the front surface of the smartphone cover 110 is mounted to correspond to the screen provided on the front of the smartphone so as to be used as a game pad.

The smartphone cover 110 according to the first embodiment of the present invention further has on the front surface thereof a game display window 113 to expose the screen of the smartphone during the game. That is, FIGS. 1 and 2 show a case where the smartphone itself is used as a game machine. In this case, a game display window 113 is further formed. In contrast, if the smartphone is connected to another display device such as a TV and the smartphone is used as the game pad, the additional game display window may not be required as in another embodiment shown in FIGS. 20 and 21. In this case, it is possible to increase the size of the direction button and the selector button, so that a manipulation sensation is further improved.

The direction button 120 is formed on the through hole 111 of the smartphone cover 110, and is made of a conductive material. To be more specific, if the direction button 120 is pressed by the finger, the direction button 120 comes into contact with a point on the upper surface of the button restoring pad 140, so that it is possible to transmit a direction signal to the point on the surface of the smartphone. That is, a micro-current of a human body serves as a button input signal via the direction button 120 and the button restoring pad 140 having conductivity, and is finally provided as the direction signal to the point on the surface of the smartphone.

The direction-change support 130 is formed into the shape of a pole that extends downwards from a central portion of a lower surface of the direction button 120, and spaces the direction button 120 apart from the surface of the smartphone. Further, the direction-change support 130 is made of an insulating material and an elastic material, and serves as a reference point for the inclination of the direction button 120 on the upper surface of the button restoring pad 140. The elastic material allows the direction-change support 130 to be bendable, thus enabling the direction button 120 to be more smoothly inclined.

The button restoring pad 140 connects the direction button 120 or the direction-change support 130 to the smartphone cover 110, and is formed into the shape of a pad made of an elastic material, thus restoring the inclined direction button 120 to an original state thereof. Further, the button restoring pad 140 according to the first embodiment of the present invention has the same shape as the through hole of the smartphone cover 110, and is made of a conductive material. Further, an end of the button restoring pad 140 is connected to an inner surface of the through hole of the smartphone cover 110, a lower surface thereof is in close contact with the surface of the smartphone, and a central portion of the upper surface thereof is connected to a lower end of the direction-change support 130, thus elastically supporting the inclination of the direction-change support 130. That is, when the direction-change support 130 is inclined by an external force as shown in FIG. 6, a first side of the button restoring pad 140 is contracted, a second side thereof is expanded, and the button restoring pad 140 is bent along with the direction-change support 130, thus supporting the inclined state and preventing the direction button 120 from being removed from the smartphone cover 110. Further, as shown in FIG. 5, when an external force is released to restore to an original state, the first side of the button restoring pad 140 is elastically expanded again, the second side thereof is elastically contracted again, and the button restoring pad 140 is restored along with the direction-change support 130.

Moreover, the button restoring pad 140 may be made of a transparent material to allow the surface of the smartphone displaying the direction image to be exposed to the outside. That is, it is possible to improve a visual effect for direction manipulation during the game.

By the smartphone cover module with the embedded game controller according to the first embodiment of the present invention configured as described above, when a point on the upper surface of the direction button 120 in the front-rear direction, the left-right direction, or the diagonal direction is pressed by an external force, the direction button 120 is inclined with respect to the direction-change support 130 and thereby may transmit a direction signal to a point on the surface of the smartphone. That is, the direction-change support 130 supports the direction button 120 on the smartphone, and an operating method is performed as follows: if the button is pressed by the finger as shown in FIG. 6, micro electricity of the finger is transmitted through the direction button 120 and the button restoring pad 140 to a surface touch panel of the smartphone, thus processing the direction of a character in a game. Here, if a specific direction is selected and pressed by the finger, the direction-change support 130 functions to prevent the direction button 120 from being pressed in another direction, thus completely preventing an undesirable direction from being selected by mistake.

As such, the smartphone cover module with the embedded game controller according to the first embodiment of the present invention may be utilized as the game pad during a game, and may be utilized as the smartphone cover that is convenient to carry with at normal times. Further, it is provided with a physical button to form a step with the surface of the smartphone cover, thereby improving the manipulation sensation of the mobile game for the smartphone.

Furthermore, the smartphone cover module with the embedded game controller according to the first embodiment of the present invention is advantageous in that a signal processing portion is composed of a touchscreen and an application program of the smartphone, so that it is possible to directly process the diagonal direction.

That is, the conventional game pad has only four direction key buttons at upper and lower positions and left and right positions, so that the diagonal direction is processed by combining two neighboring buttons with each other. By contrast, according to the first embodiment of the present invention, the diagonal direction is processed by the program in the smartphone, so that it is possible to freely process eight directions, including front and rear directions, left and right directions, and diagonal directions. Moreover, it is possible to precisely control the diagonal direction at various angles.

Second Embodiment

Figure 7:
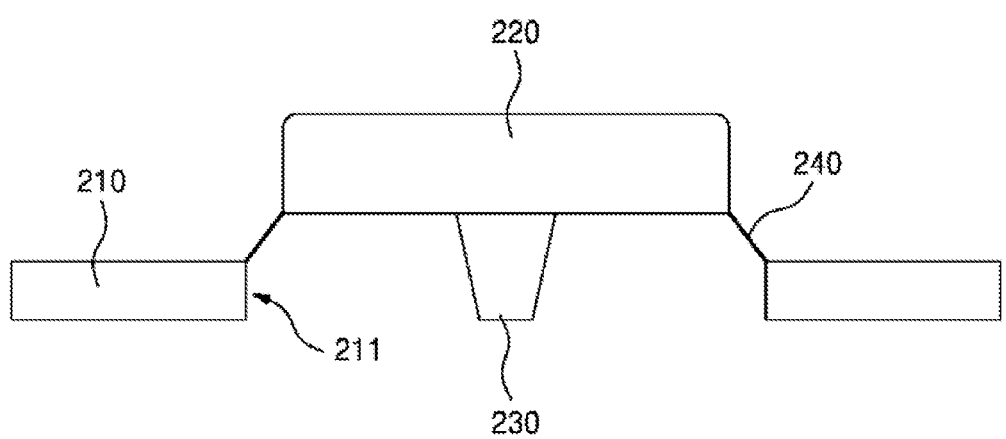
FIG. 7 is a sectional view showing a direction button of a smartphone cover module with an embedded game controller according to a second embodiment of the present invention.
Figure 8:
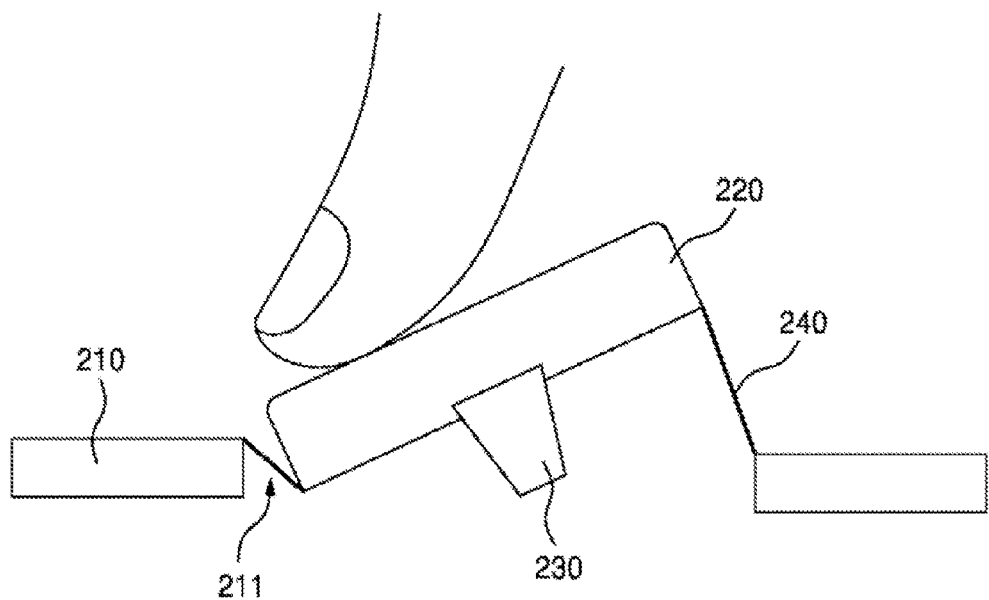
FIG. 8 is a sectional view showing an operation of the direction button of the smartphone cover module with the embedded game controller according to the second embodiment of the present invention.
Figure 9A:
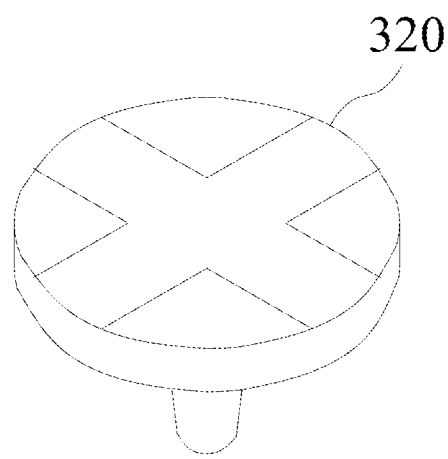
FIGS. 9A to 9D are perspective views and plan views, respectively, showing a direction button of a smartphone cover module with an embedded game controller according to a third embodiment of the present invention.
Figure 9B:
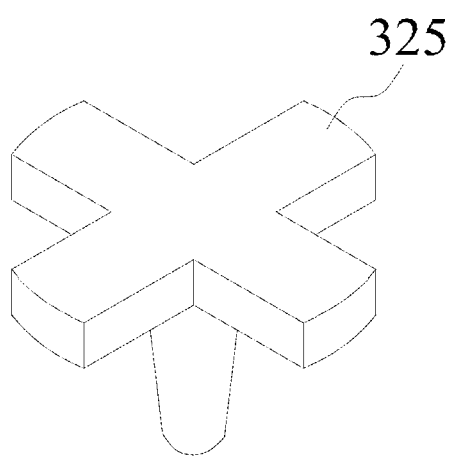
Figure 9C:
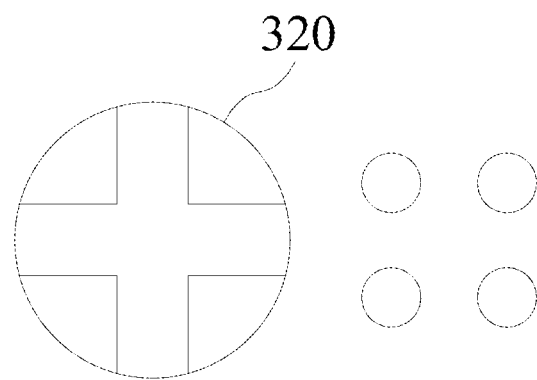
Figure 9D:
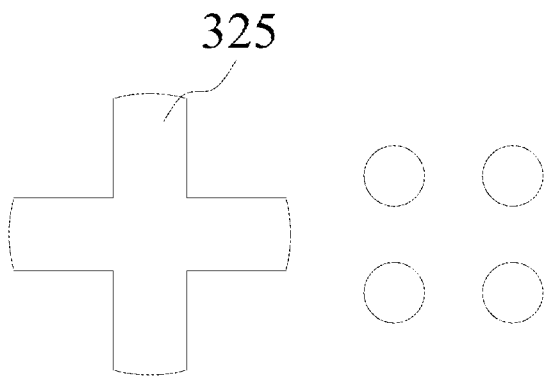

FIGS. 7 and 8 are views illustrating a smartphone cover module with an embedded game controller according to a second embodiment of the present invention. To be more specific, FIG. 7 is a sectional view showing a direction button of the smartphone cover module with the embedded game controller according to the second embodiment of the present invention, and FIG. 8 is a sectional view showing an operation of the direction button of the smartphone cover module with the embedded game controller according to the second embodiment of the present invention.

As shown in FIGS. 7 and 8, the smartphone cover module with the embedded game controller according to the second embodiment of the present invention includes a smartphone cover 210, a direction button 220, a direction-change support 230, and a button restoring pad 240.

Since the smartphone cover 210 and the direction button 220 of the smartphone cover module with the embedded game controller according to the second embodiment of the present invention have the same or similar structure or operation as those of the smartphone cover 110 and the direction button 120 of the smartphone cover module with the embedded game controller according to the first embodiment of the present invention, the detailed description thereof will refer to the first embodiment of the present invention shown in FIGS. 1 to 6 and will be omitted herein.

The substantial structure and operation of the direction-change support 230 and the button restoring pad 240 will be described below with reference to FIGS. 7 and 8.

The button restoring pad 240 according to the second embodiment of the present invention is configured such that a first end thereof is formed along a side surface of the direction button 220 and a second end thereof is formed along a side surface of the through hole 211 of the smartphone cover 210, thus elastically supporting the inclination of the direction button 220. That is, when the direction button 220 is inclined by an external force as shown in FIG. 8, a first side of the button restoring pad 240 is contracted, a second side thereof is expanded, thus supporting the inclined state and preventing the direction button 220 from being removed from the smartphone cover 210. Further, as shown in FIG. 7, when an external force is released to restore to an original state, the first side of the button restoring pad 240 is elastically expanded again, and the second side thereof is elastically contracted again.

Further, the direction-change support 230 is made of an insulating material and a hard material, and a lower end of the direction-change support 230 is in contact with the surface of the smartphone cover 210, thus serving as a reference point for the inclination of the direction button 220. More preferably, the direction-change support 230 according to the second embodiment of the present invention is made of the hard material, unlike the direction-change support 130 according to the first embodiment of the present invention, so that it is not bendable.

Therefore, the direction button 220 is in direct contact with a point on the surface of the smartphone, so that a microcurrent of a human body serves as a button input signal via the direction button 220 having conductivity and is directly provided as the direction signal to the point on the surface of the smartphone.

Meanwhile, similarly to the first embodiment of the present invention, the button restoring pad 240 may be made of a transparent material to allow the surface of the smartphone displaying the direction image to be exposed to the outside. That is, it is possible to improve a visual effect when the direction button 220 is manipulated.

By the smartphone cover module with the embedded game controller according to the second embodiment of the present invention configured as described above, when a point on the upper surface of the direction button 220 in the front-rear direction, the left-right direction, or the diagonal direction is pressed by an external force, the direction button 220 is inclined with respect to the direction-change support 230 and thereby may transmit a direction signal to a point on the surface of the smartphone. That is, the direction-change support 230 supports the direction button 220 on the smartphone, and an operating method is performed as follows: if the button is pressed by the finger as shown in FIG. 8, micro electricity of the finger is transmitted through the direction button 220 to a surface touch panel of the smartphone, thus processing the direction of a character in a game. Here, if a specific direction is selected and pressed by the finger, the direction-change support 230 functions to prevent the direction button 220 from being pressed in another direction, thus completely preventing an undesirable direction from being selected by mistake.

As such, the smartphone cover module with the embedded game controller according to the second embodiment of the present invention may be utilized as the game pad during a game, and may be utilized as the smartphone cover that is convenient to carry with at normal times. Further, it is provided with a physical button to form a step with the surface of the smartphone cover, thereby improving the manipulation sensation of the mobile game for the smartphone.

Furthermore, the smartphone cover module with the embedded game controller according to the second embodiment of the present invention is advantageous in that a signal processing portion is composed of a touchscreen and an application program of the smartphone, so that it is possible to directly process the diagonal direction.

That is, the conventional game pad has only four direction key buttons at upper and lower positions and left and right positions, so that the diagonal direction is processed by combining two neighboring buttons with each other. By contrast, according to the second embodiment of the present invention, the diagonal direction is processed by the program in the smartphone, so that it is possible to freely process eight directions, including front and rear directions, left and right directions, and diagonal directions. Moreover, it is possible to precisely control the diagonal direction at various angles.

Third Embodiment

FIGS. 9A to 9D are perspective views and plan views, respectively, showing a direction button of a smartphone cover module with an embedded game controller according to a third embodiment of the present invention.

As shown in FIGS. 9A to 9D, the smartphone cover module according to the present invention may have a direction button of various shapes, including an elliptical shape, a rectangular shape, and a hexagonal shape, as well as the circular direction button 120, 220, 320. Moreover, it is possible to use a cross-shaped direction button 325. That is, an edge of the direction button is configured to be in direct or indirect contact with the surface of the smartphone, thus directly transmitting a direction signal. Hence, the direction button may adopt any shape as long as the edge of the direction button is in free contact with the surface of the smartphone.

Fourth Embodiment

Figure 10:
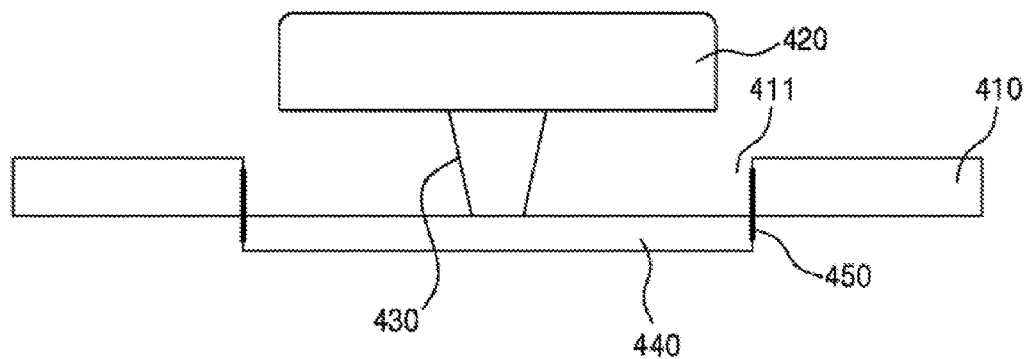
FIG. 10 is a sectional view showing a direction button of a smartphone cover module with an embedded game controller according to a fourth embodiment of the present invention.
Figure 11:
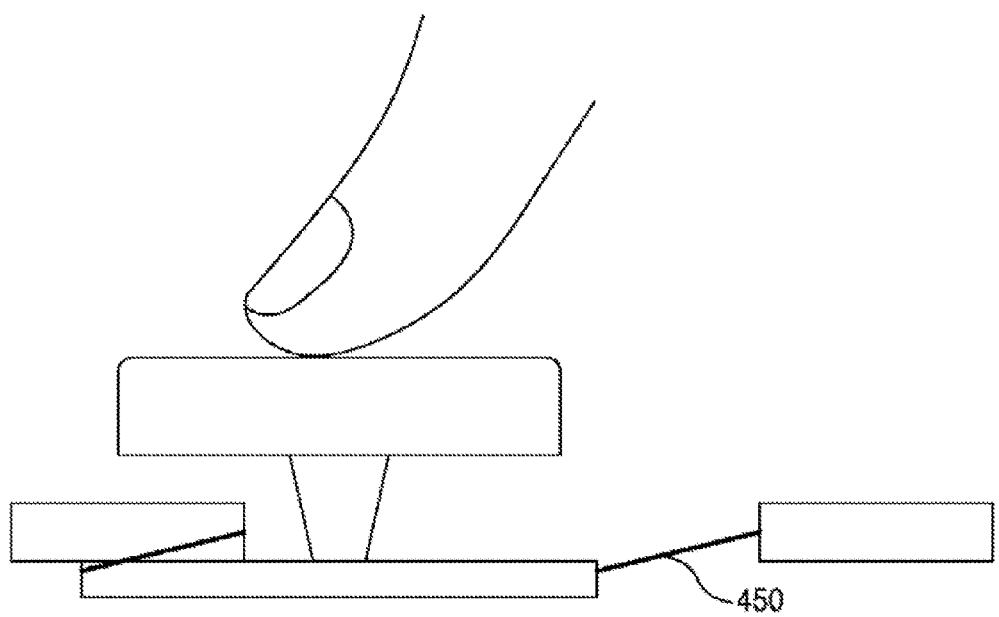
FIG. 11 is a sectional view showing an operation of the direction button of the smartphone cover module with the embedded game controller according to the fourth embodiment of the present invention.

FIGS. 10 and 11 are views illustrating a smartphone cover module with an embedded game controller according to a fourth embodiment of the present invention. To be more specific, FIG. 10 is a sectional view showing a direction button of the smartphone cover module with the embedded game controller according to the fourth embodiment of the present invention, and FIG. 11 is a sectional view showing an operation of the direction button of the smartphone cover module with the embedded game controller according to the fourth embodiment of the present invention.

As shown in FIGS. 10 and 11, the smartphone cover module with the embedded game controller according to the fourth embodiment of the present invention includes a smartphone cover 410, a direction button 420, a spacing support 430, a direction-change pad 440, and a button restoring pad 450.

Since the smartphone cover 410 of the smartphone cover module with the embedded game controller according to the fourth embodiment of the present invention has the same or similar structure or operation as those of the smartphone cover 110 of the smartphone cover module with the embedded game controller according to the first embodiment of the present invention, the detailed description thereof will refer to the first embodiment of the present invention shown in FIGS. 1 to 6 and will be omitted herein.

The direction button 420 is formed on a through hole 411 of the smartphone cover 410 in such a way as to be movable in a front-rear direction, a left-right direction, or a diagonal direction, and is made of a conductive material. To be more specific, if the direction button 420 is pressed and pushed by the finger, the direction button 420 may move to a point in the front-rear direction, the left-right direction, or the diagonal direction, thus allowing a direction signal to be transmitted to the point on the surface of the smartphone. That is, a microcurrent of a human body serves as a button input signal via the direction button 420, the spacing support 430 and the direction-change pad 440 having conductivity and is finally provided as the direction signal to the point on the surface of the smartphone. Further, an extent of movement of the direction-change pad 440 varies depending on an extent of movement of the direction button 420. Here, a moving amount on the surface of the smartphone is provided as an intensity signal.

The spacing support 430 is formed into the shape of a pole that extends downwards from a central portion of a lower surface of the direction button 420, and spaces the direction button 420 apart from the surface of the smartphone. The spacing support 430 is also made of a conductive material.

The direction-change pad 440 is connected to a lower end of the spacing support 430, comes into contact with the surface of the smartphone, and moves on the surface of the smartphone in conjunction with the movement of the direction button 420. The direction-change pad 440 is also made of a conductive material. Moreover, the direction-change pad 440 may be made of a transparent material to allow the surface of the smartphone displaying the direction image to be exposed to the outside. That is, it is possible to improve a visual effect for direction manipulation during the game.

The button restoring part 450 is provided on a side surface of the direction-change pad 440, is made of an elastic material, and restores the direction button 420 from a moved position to a center of the through hole 411 of the smartphone cover 410. To be more specific, referring to FIGS. 10 and 11, the button restoring part 450 is configured such that a first end thereof is formed along the side surface of the direction-change pad 440 and a second end thereof is formed along the side surface of the through hole 411 of the smartphone cover 410, thus elastically supporting the movement of the direction-change pad 440.

That is, when an external force is applied as shown in FIG. 11, first and second sides of the button restoring part 450 are expanded and extended to a point, thus supporting the moved direction-change pad 440 and preventing the direction button 420 from being removed from the smartphone cover 410. Further, when the external force is released to restore to an original state as shown in FIG. 10, the first and second sides of the button restoring part 450 are elastically contracted again and are restored along with the direction-change pad 440. Here, the button restoring part 450 is made of a non-conductive material.

In the smartphone cover module with the embedded game controller according to the fourth embodiment of the present invention configured as described above, when a point on an upper surface of the direction button 420 in a front-rear direction, a left-right direction, or a diagonal direction is pressed by an external force, the direction-change pad 440 may be moved in an associated direction and both a direction signal and an intensity signal may be transmitted to a point on the surface of the smartphone. That is, the spacing support 430 supports the direction button 420 and the direction-change pad 440 in a vertical direction, and is operated such that, when the button is pressed by the finger as shown in FIG. 11, micro electricity of the finger is transmitted through the direction button 420, the spacing support 430, and the direction-change pad 440 to a surface touch panel of the smartphone, thus processing the direction of a character in a game. Here, if a specific direction is selected by the finger, the direction-change pad 440 is naturally moved to only one point, thus completely preventing an undesirable direction from being selected by mistake.

As such, the smartphone cover module with the embedded game controller according to the fourth embodiment of the present invention may be utilized as the game pad during a game, and may be utilized as the smartphone cover that is convenient to carry with at normal times. Further, it is provided with a physical button to form a step with the surface of the smartphone cover, thereby improving the manipulation sensation of the mobile game for the smartphone.

Furthermore, the smartphone cover module with the embedded game controller according to the fourth embodiment of the present invention is advantageous in that a signal processing portion is composed of a touchscreen and an application program of the smartphone, so that it is possible to directly process the diagonal direction.

That is, the conventional game pad has only four direction key buttons at upper and lower positions and left and right positions, so that the diagonal direction is processed by combining two neighboring buttons with each other. By contrast, according to the fourth embodiment of the present invention, the diagonal direction is processed by the program in the smartphone, so that it is possible to freely process eight directions, including front and rear directions, left and right directions, and diagonal directions. Moreover, it is possible to precisely control the diagonal direction at various angles.

Further, the smartphone cover module with the embedded game controller according to the fourth embodiment of the present invention is advantageous in that it is possible to control a direction change intensity depending on an extent of movement in a moving direction when the direction button is manipulated during a game.

Fifth Embodiment

Figure 12:
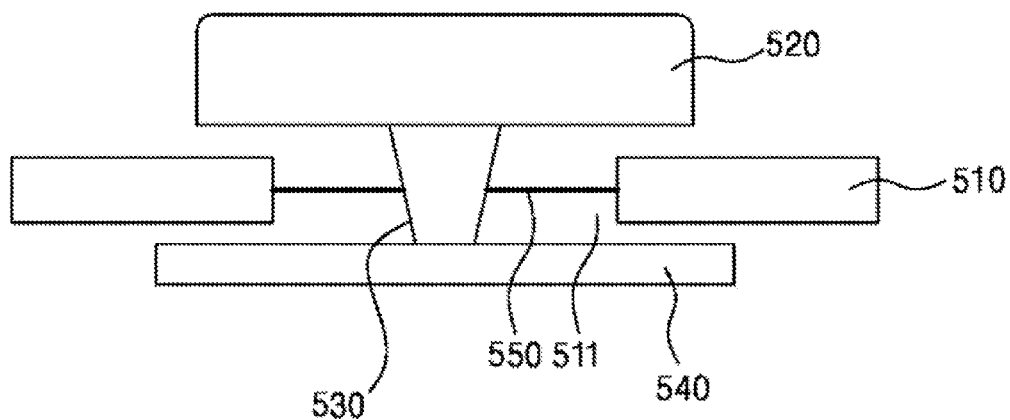
FIG. 12 is a sectional view showing a direction button of a smartphone cover module with an embedded game controller according to a fifth embodiment of the present invention.
Figure 13:
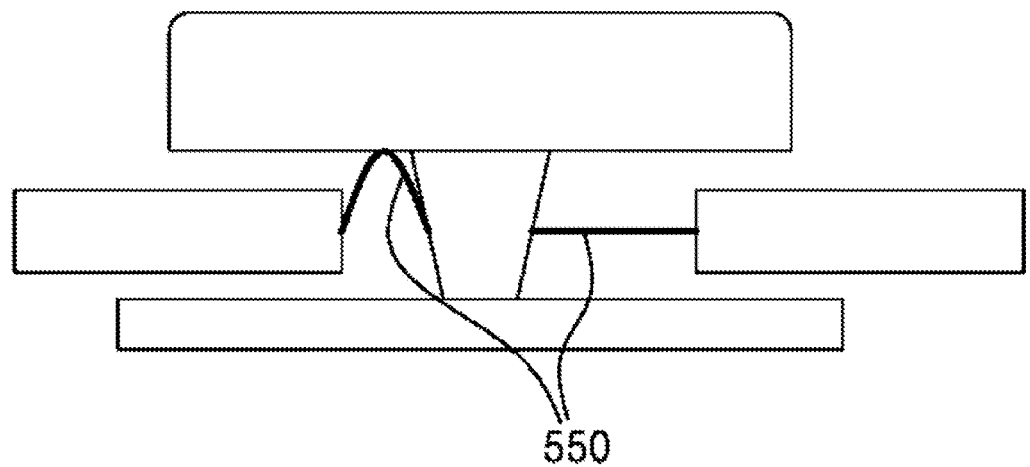
FIG. 13 is a sectional view showing an operation of the direction button of the smartphone cover module with the embedded game controller according to the fifth embodiment of the present invention.

FIGS. 12 and 13 are views illustrating a smartphone cover module with an embedded game controller according to a fifth embodiment of the present invention. To be more specific, FIG. 12 is a sectional view showing a direction button of the smartphone cover module with the embedded game controller according to the fifth embodiment of the present invention, and FIG. 13 is a sectional view showing an operation of the direction button of the smartphone cover module with the embedded game controller according to the fifth embodiment of the present invention.

As shown in FIGS. 12 and 13, the smartphone cover module with the embedded game controller according to the fifth embodiment of the present invention includes a smartphone cover 510, a direction button 520, a spacing support 530, a direction-change pad 540, and a button restoring pad 550.

Since the smartphone cover 510, the direction button 520, the spacing support 530, and the direction-change pad 540 of the smartphone cover module with the embedded game controller according to the fifth embodiment of the present invention have the same or similar structure or operation as those of the smartphone cover 410, the direction button 420, the spacing support 430, and the direction-change pad 440 of the smartphone cover module with the embedded game controller according to the fourth embodiment of the present invention, the detailed description thereof will refer to the fourth embodiment of the present invention shown in FIGS. 10 and 11 and will be omitted herein.

The substantial structure and operation of the button restoring pad 550 will be described below with reference to FIGS. 12 and 13.

The button restoring pad 550 according to the fifth embodiment of the present invention is configured such that a first end thereof is formed along a side surface of the spacing support 530 and a second end thereof is formed along a side surface of the through hole 511 of the smartphone cover 510, thus elastically supporting the movement of the direction-change pad 540.

That is, when an external force is applied as shown in FIG. 13, a first side of the button restoring pad 550 is contracted, a second side thereof is expanded, thus supporting the moved state and preventing the direction button 520 from being removed from the smartphone cover 510. Further, as shown in FIG. 12, when an external force is released to restore to an original state, the first side of the button restoring pad 550 is elastically expanded again, and the second side thereof is elastically contracted again.

Therefore, in the state where the direction-change pad 540 is in direct contact with a point on the surface of the smartphone, a micro-current of a human body serves as a button input signal via the direction button 520 having conductivity and is directly provided as the direction signal to the point on the surface of the smartphone.

In the smartphone cover module with the embedded game controller according to the fifth embodiment of the present invention configured as described above, when a point on an upper surface of the direction button 520 in a front-rear direction, a left-right direction, or a diagonal direction is pressed by an external force, the direction-change pad 540 may be moved in an associated direction and both a direction signal and an intensity signal may be transmitted to a point on the surface of the smartphone. That is, the spacing support 530 supports the direction button 520 and the direction-change pad 540 in a vertical direction, and is operated such that, when the button is pressed by the finger as shown in FIG. 13, micro electricity of the finger is transmitted through the direction button 520, the spacing support 530, and the direction-change pad 540 to a surface touch panel of the smartphone, thus processing the direction of a character in a game. Here, if a specific direction is selected by the finger, the direction-change pad 540 is naturally moved to only one point, thus completely preventing an undesirable direction from being selected by mistake. Further, an extent of movement of the direction-change pad 540 varies depending on an extent of movement of the direction button 520. Here, a moving amount on the surface of the smartphone is provided as an intensity signal.

As such, the smartphone cover module with the embedded game controller according to the fifth embodiment of the present invention may be utilized as the game pad during a game, and may be utilized as the smartphone cover that is convenient to carry with at normal times. Further, it is provided with a physical button to form a step with the surface of the smartphone cover, thereby improving the manipulation sensation of the mobile game for the smartphone.

Furthermore, the smartphone cover module with the embedded game controller according to the fifth embodiment of the present invention is advantageous in that a signal processing portion is composed of a touchscreen and an application program of the smartphone, so that it is possible to directly process the diagonal direction.

That is, the conventional game pad has only four direction key buttons at upper and lower positions and left and right positions, so that the diagonal direction is processed by combining two neighboring buttons with each other. By contrast, according to the fifth embodiment of the present invention, the diagonal direction is processed by the program in the smartphone, so that it is possible to freely process eight directions, including front and rear directions, left and right directions, and diagonal directions. Moreover, it is possible to precisely control the diagonal direction at various angles.

Further, the smartphone cover module with the embedded game controller according to the fifth embodiment of the present invention is advantageous in that it is possible to control a direction change intensity depending on an extent of movement in a moving direction when the direction button is manipulated during a game.

Sixth Embodiment

Figure 14A:
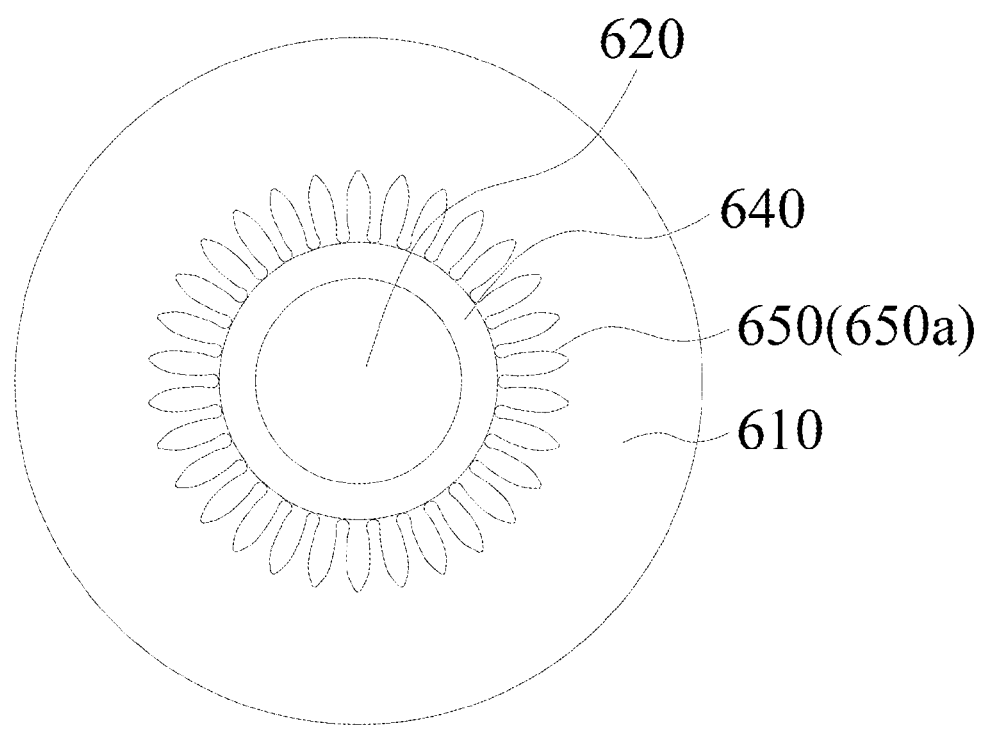
FIGS. 14A and 14B are a plan view and a sectional view, respectively, showing a direction button of a smartphone cover module with an embedded game controller according to a sixth embodiment of the present invention.
Figure 14B:
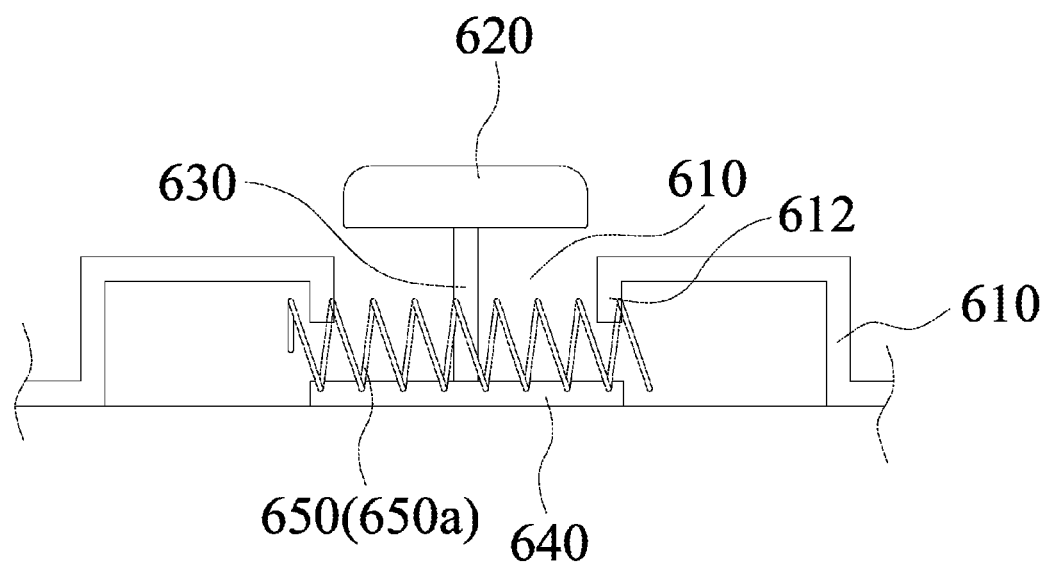
Figure 17A:
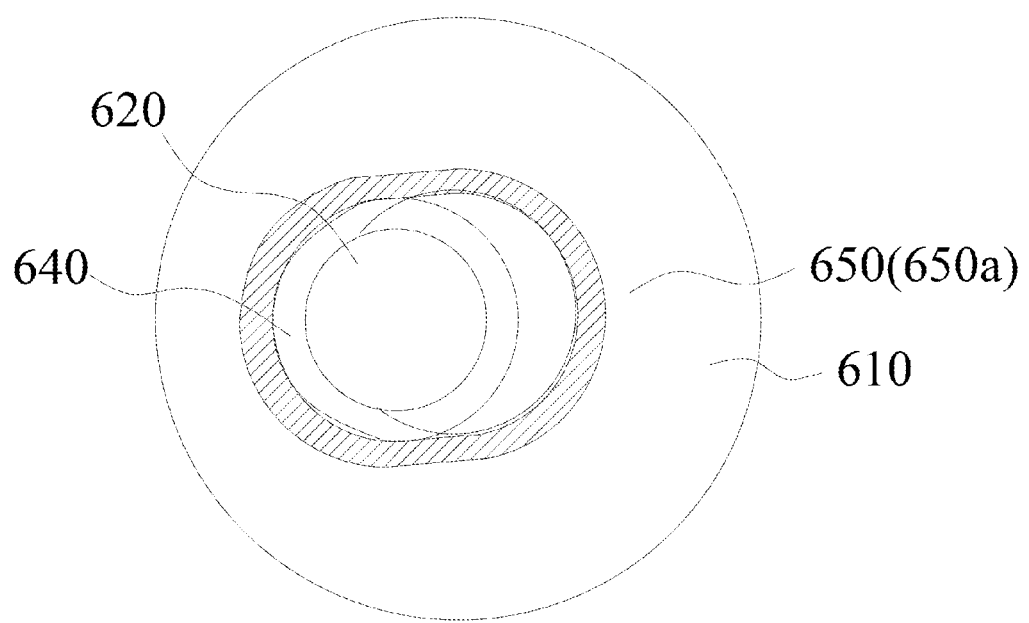
FIGS. 17A and 17B are a plan view and a sectional view, respectively, showing an operation of another direction button of the smartphone cover module with the embedded game controller according to the sixth embodiment of the present invention.
Figure 17B:
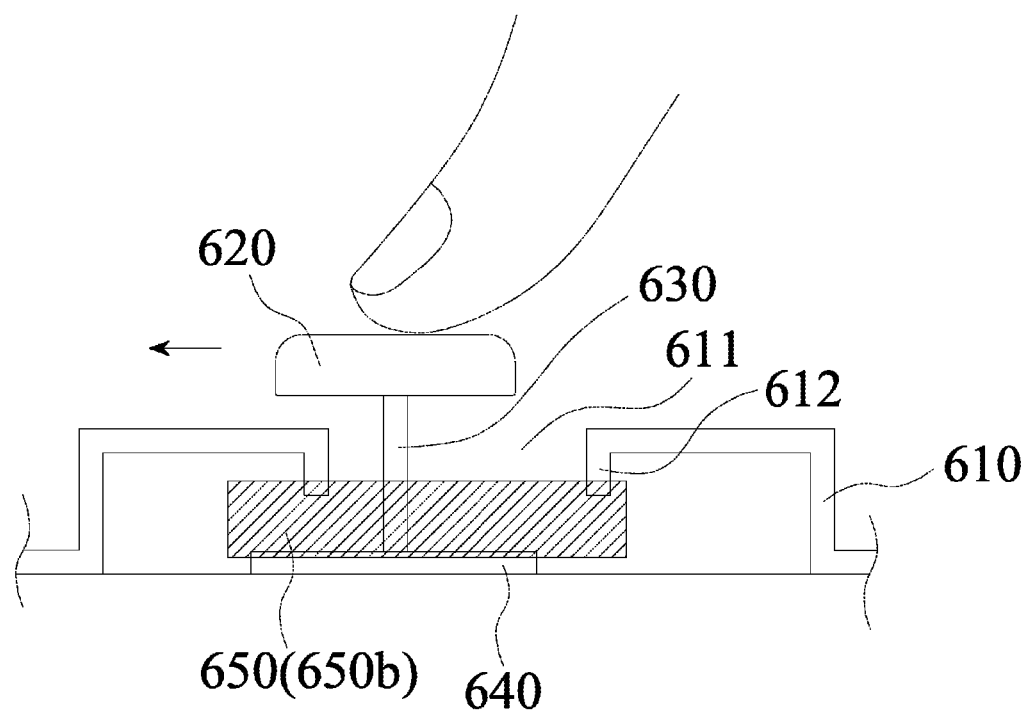
Figure 18A:
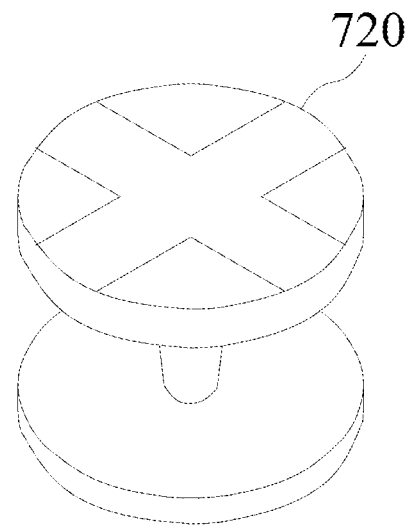
FIGS. 18A to 18D are perspective views and plan views, respectively, showing a direction button of a smartphone cover module with an embedded game controller according to a seventh embodiment of the present invention.
Figure 18B:
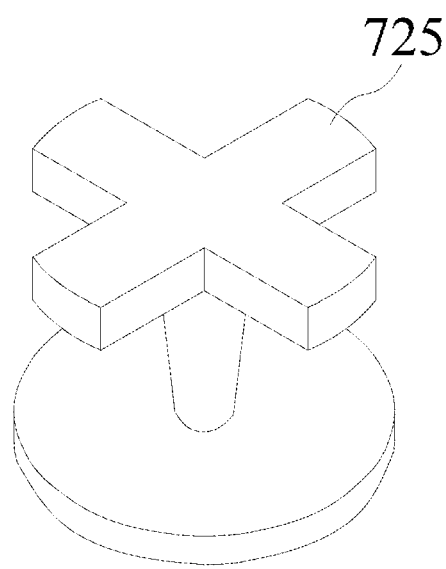
Figure 18C:
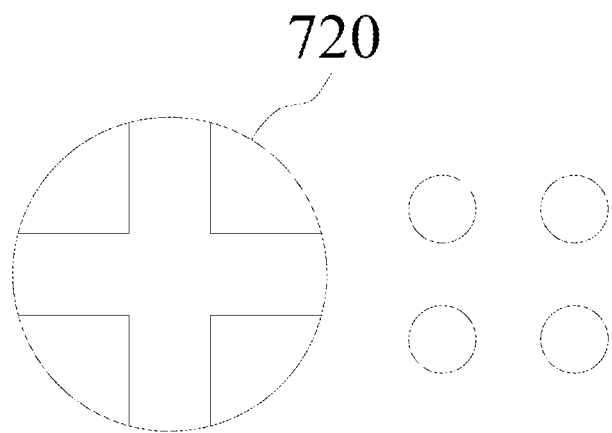
Figure 18D:
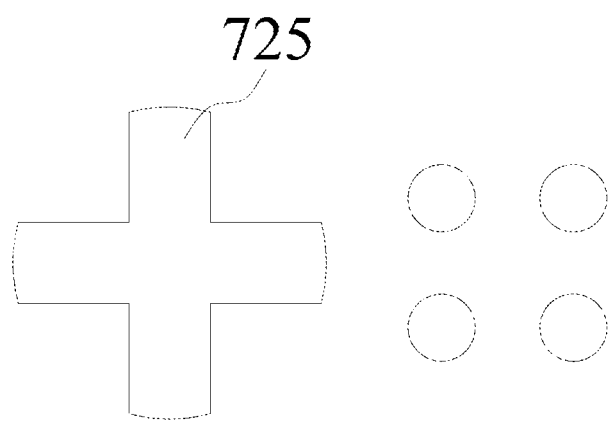

FIGS. 14A and 14B to FIGS. 17A and 17B are views illustrating a smartphone cover module with an embedded game controller according to a sixth embodiment of the present invention. To be more specific, FIGS. 14A and 14B are a plan view and a sectional view, respectively, showing a direction button of the smartphone cover module with the embedded game controller according to the sixth embodiment of the present invention, FIGS. 15A and 15B are a plan view and a sectional view, respectively, showing an operation of the direction button of the smartphone cover module with the embedded game controller according to the sixth embodiment of the present invention, FIGS. 16A and 16B are a plan view and a sectional view, respectively, showing another direction button of the smartphone cover module with the embedded game controller according to the sixth embodiment of the present invention, and FIGS. 17A and 17B are a plan view and a sectional view, respectively, showing an operation of another direction button of the smartphone cover module with the embedded game controller according to the sixth embodiment of the present invention.

As shown in FIGS. 14A and 14B to FIGS. 17A and 17B, the smartphone cover module with the embedded game controller according to the sixth embodiment of the present invention includes a smartphone cover 610, a direction button 620, a spacing support 630, a direction-change pad 640, and a button restoring part 650.

Since the smartphone cover 610, the direction button 620, the spacing support 630, and the direction-change pad 640 of the smartphone cover module with the embedded game controller according to the sixth embodiment of the present invention have the same or similar structure or operation as those of the smartphone cover 410, the direction button 420, the spacing support 430, and the direction-change pad 440 of the smartphone cover module with the embedded game controller according to the fourth embodiment of the present invention, the detailed description thereof will refer to the fourth embodiment of the present invention shown in FIGS. 10 and 11 and will be omitted herein.

The substantial structure and operation of the button restoring pad 650 will be described below with reference to FIGS. 14A and 14B to FIGS. 17A and 17B.

The button restoring part 650 according to the sixth embodiment of the present invention is made of an elastic material of either of a ring-shaped spring 650a or a rubber band 650b to surround side surfaces of the spacing support 630 and the direction-change pad 640, and the through hole 611 of the smartphone cover 610 is provided with a locking protrusion 612 that is downwardly bent, thus locking the button restoring part 650 of the spring 650a or the rubber band 650b to a center of the through hole 611 and thereby elastically supporting a movement of the direction-change pad 640.

That is, as shown in FIGS. 15A and 15B and FIGS. 17A and 17B, when an external force is applied, a first side of the button restoring part 650 provided in the form of the ring-shaped spring 650a or the rubber band 650b is caught and locked by the locking protrusion 612, while a second side thereof is expanded, thus supporting a moved state and preventing the direction button 620 from being removed from the smartphone cover 610. Further, when an external force is released to restore to an original state as shown in FIGS. 14A and 14B and FIGS. 16A and 16B, the second side of the button restoring part 650 is elastically contracted again in the state where the first side thereof is caught and locked by the locking protrusion 612.

Figure 15A:
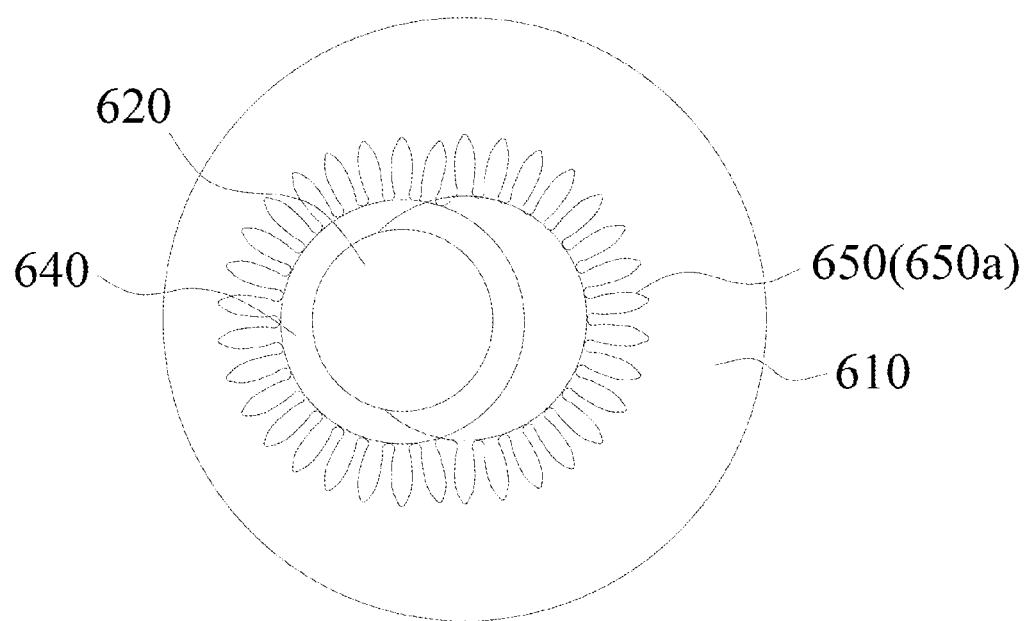
FIGS. 15A and 15B are a plan view and a sectional view, respectively, showing an operation of the direction button of the smartphone cover module with the embedded game controller according to the sixth embodiment of the present invention.
Figure 15B:
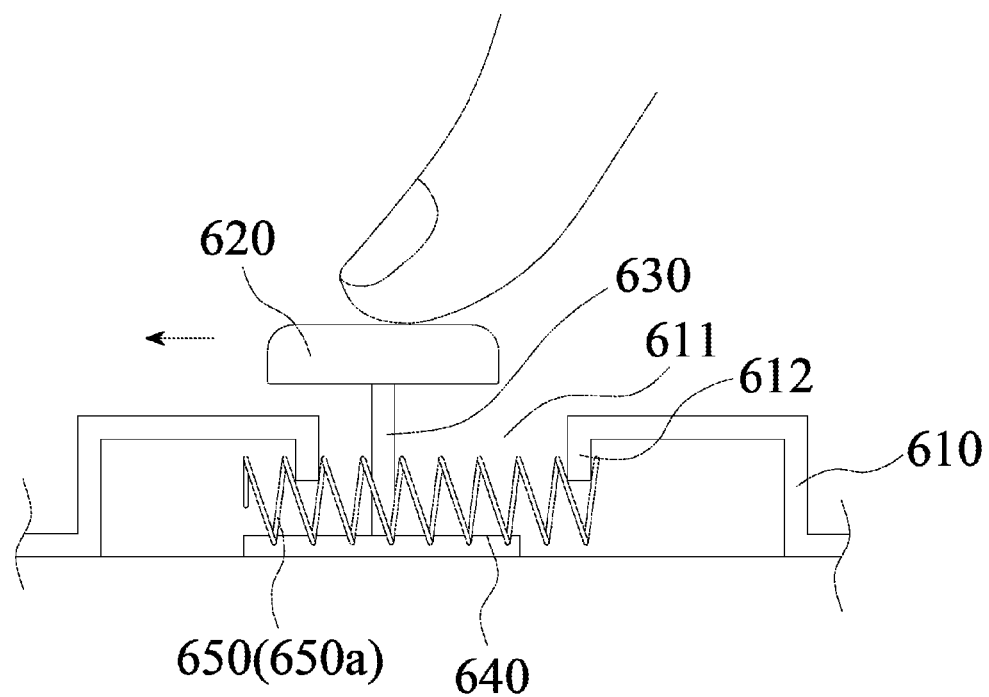
Figure 16A:
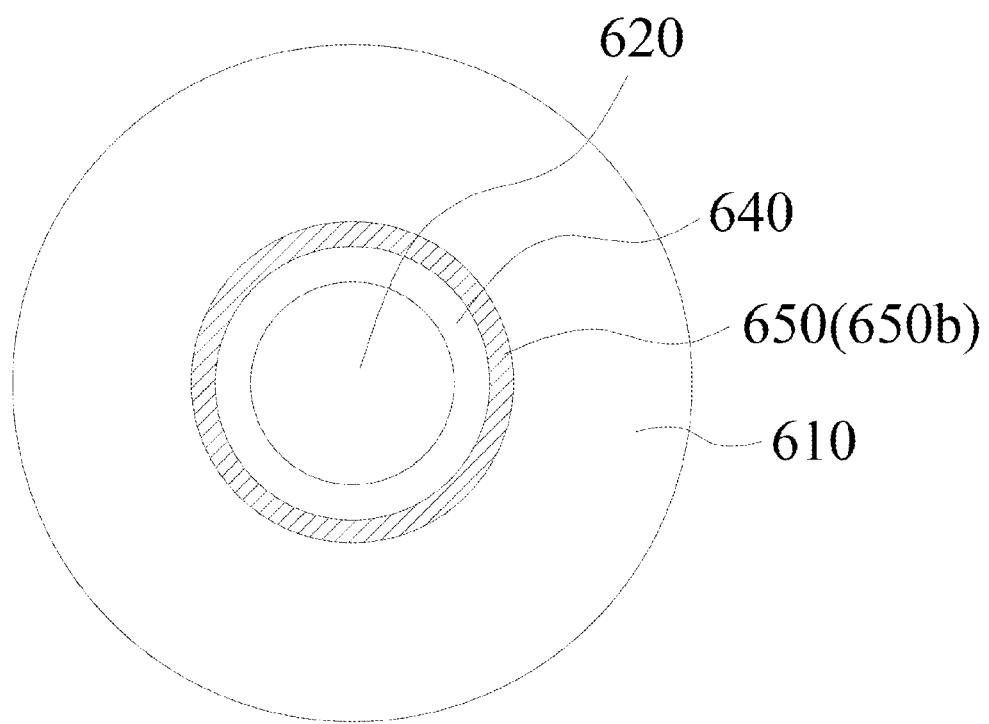
FIGS. 16A and 16B are a plan view and a sectional view, respectively, showing another direction button of the smartphone cover module with the embedded game controller according to the sixth embodiment of the present invention.
Figure 16B:
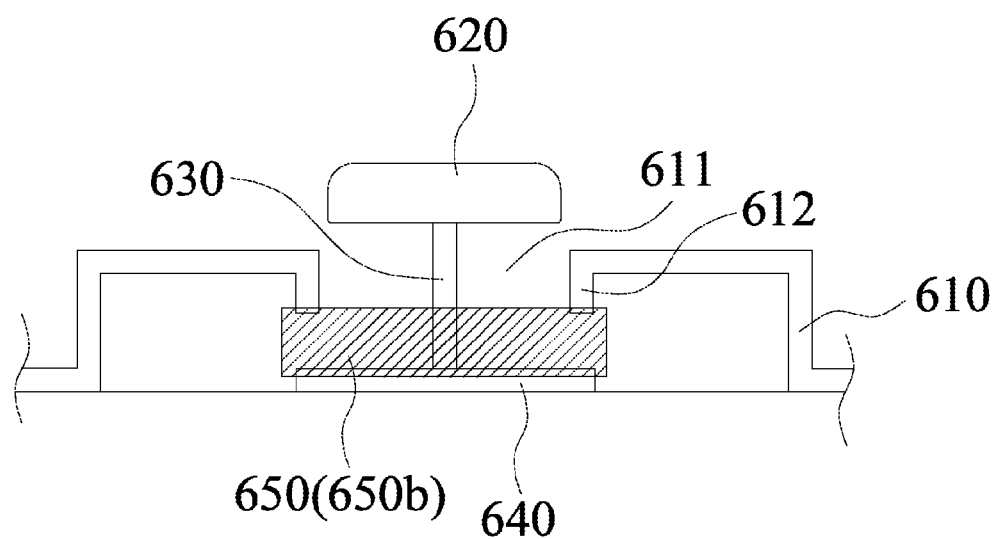

In the smartphone cover module with the embedded game controller according to the sixth embodiment of the present invention configured as described above, when a point on an upper surface of the direction button 620 in a front-rear direction, a left-right direction, or a diagonal direction is pressed by an external force, the direction-change pad 640 may be moved in an associated direction and both a direction signal and an intensity signal may be transmitted to a point on the surface of the smartphone. That is, the spacing support 630 supports the direction button 620 and the direction-change pad 640 in a vertical direction, and is operated such that, when the button is pressed by the finger as shown in FIGS. 15B and 17B, micro electricity of the finger is transmitted through the direction button 620, the spacing support 630, and the direction-change pad 640 to a surface touch panel of the smartphone, thus processing the direction of a character in a game. Here, if a specific direction is selected by the finger, the direction-change pad 640 is naturally moved to only one point, thus completely preventing an undesirable direction from being selected by mistake. Further, an extent of movement of the direction-change pad 640 varies depending on an extent of movement of the direction button 620. Here, a moving amount on the surface of the smartphone is provided as an intensity signal.

As such, the smartphone cover module with the embedded game controller according to the sixth embodiment of the present invention may be utilized as the game pad during a game, and may be utilized as the smartphone cover that is convenient to carry with at normal times. Further, it is provided with a physical button to form a step with the surface of the smartphone cover, thereby improving the manipulation sensation of the mobile game for the smartphone.

Furthermore, the smartphone cover module with the embedded game controller according to the sixth embodiment of the present invention is advantageous in that a signal processing portion is composed of a touchscreen and an application program of the smartphone, so that it is possible to directly process the diagonal direction.

That is, the conventional game pad has only four direction key buttons at upper and lower positions and left and right positions, so that the diagonal direction is processed by combining two neighboring buttons with each other. By contrast, according to the sixth embodiment of the present invention, the diagonal direction is processed by the program in the smartphone, so that it is possible to freely process eight directions, including front and rear directions, left and right directions, and diagonal directions. Moreover, it is possible to precisely control the diagonal direction at various angles.

Further, the smartphone cover module with the embedded game controller according to the sixth embodiment of the present invention is advantageous in that it is possible to control a direction change intensity depending on an extent of movement in a moving direction when the direction button is manipulated during a game.

Seventh Embodiment

FIGS. 18A to 18D are perspective views and plan views, respectively, showing a direction button of a smartphone cover module with an embedded game controller according to a seventh embodiment of the present invention.

As shown in FIGS. 18A to 18D, the smartphone cover module according to the present invention may have a direction button of various shapes, including an elliptical shape, a rectangular shape, and a hexagonal shape, as well as the circular direction button 420, 520, 620, 720. Moreover, it is possible to use a cross-shaped direction button 725. That is, the direction button is configured to move freely on the through hole of the smartphone cover, thus allowing a direction signal to be directly transmitted. Hence, the direction button may adopt any shape as long as it is pushed by the finger to be movable in the front-rear direction, the left-right direction, or the diagonal direction.

Eighth Embodiment

Figure 19:
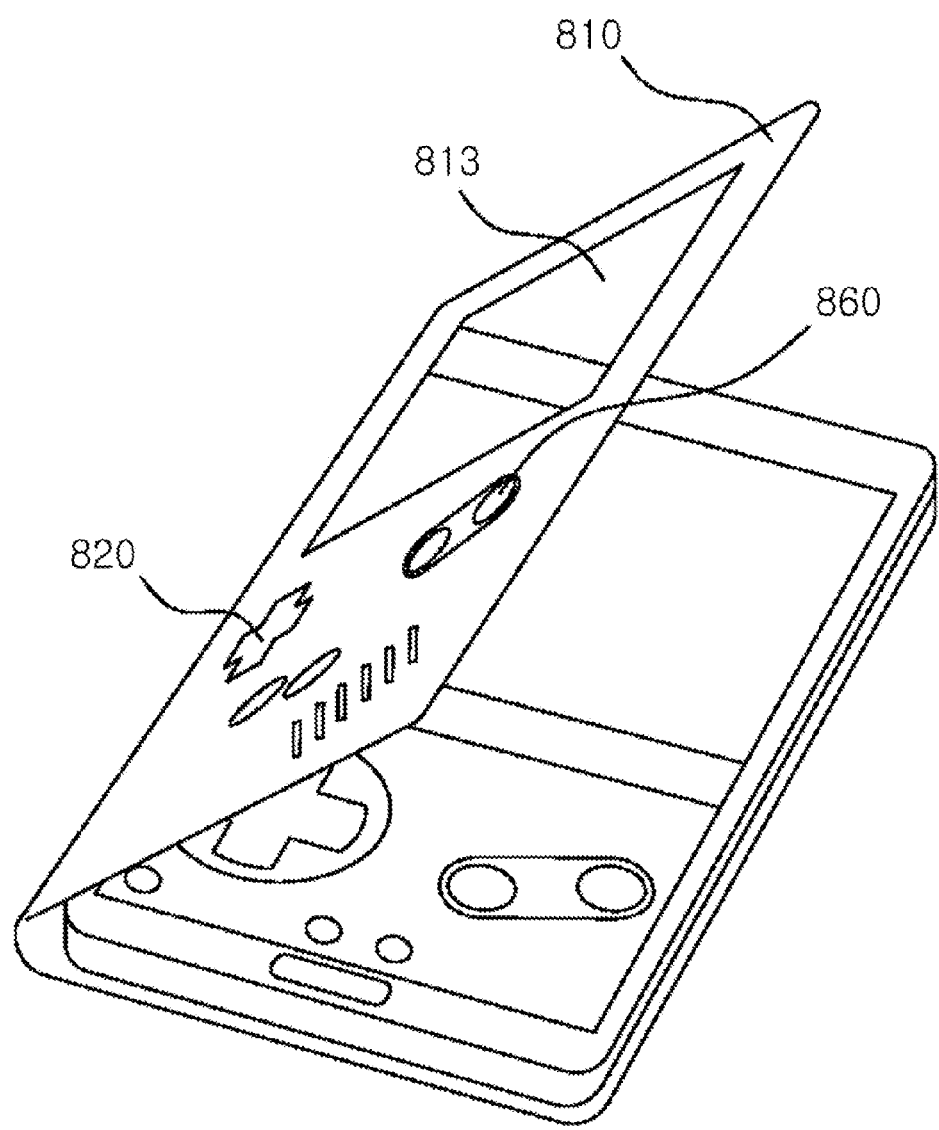
FIG. 19 is a perspective view showing a smartphone cover module with an embedded game controller according to an eighth embodiment of the present invention.

FIG. 19 is a perspective view showing a smartphone cover module with an embedded game controller according to an eighth embodiment of the present invention.

As shown in FIG. 19, a smartphone cover 810 according to an eighth embodiment of the present invention has on a front surface thereof a direction button 820 and a selector button 860 provided adjacent to the direction button 820, and may be formed into a shape of a flip cover that is rotatable at a front surface thereof. That is, it is configured to merely open or close a front surface, so that the smartphone cover module with the embedded game controller can be easily used as a game pad.

In addition, the smartphone cover 810 according to the eighth embodiment of the present invention further includes on the front surface thereof a game display window 813 to expose the screen of the smartphone during the game. That is, FIG. 19 shows a case where the smartphone itself is used as a game machine. In this case, the additional game display window 813 is further formed.

Figure 20:
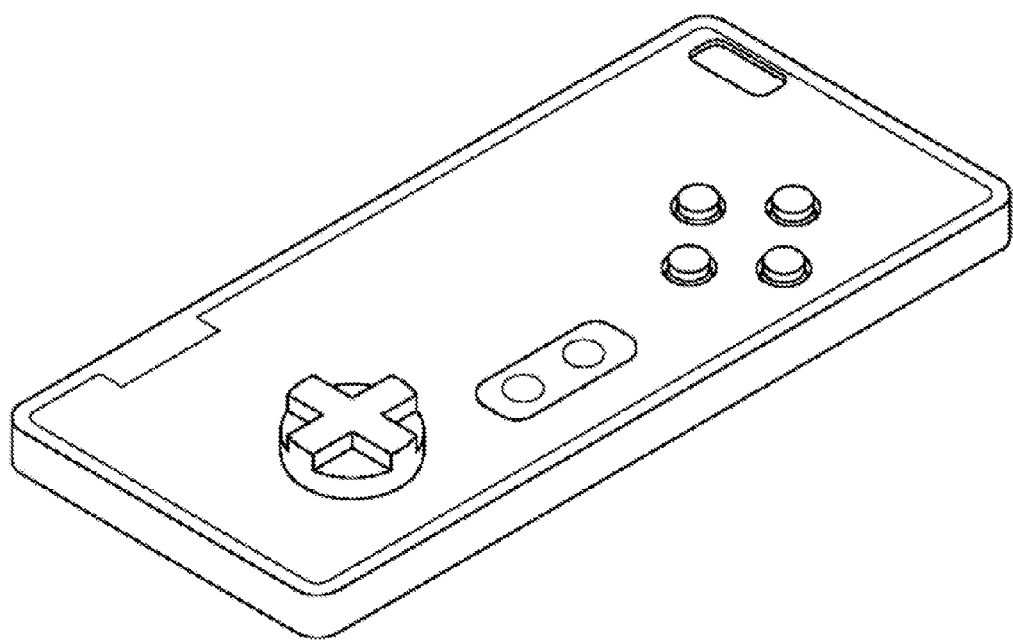
FIG. 20 is a perspective view showing a smartphone cover module with an embedded game controller according to another embodiment of the present invention when viewed from a front.
Figure 21:
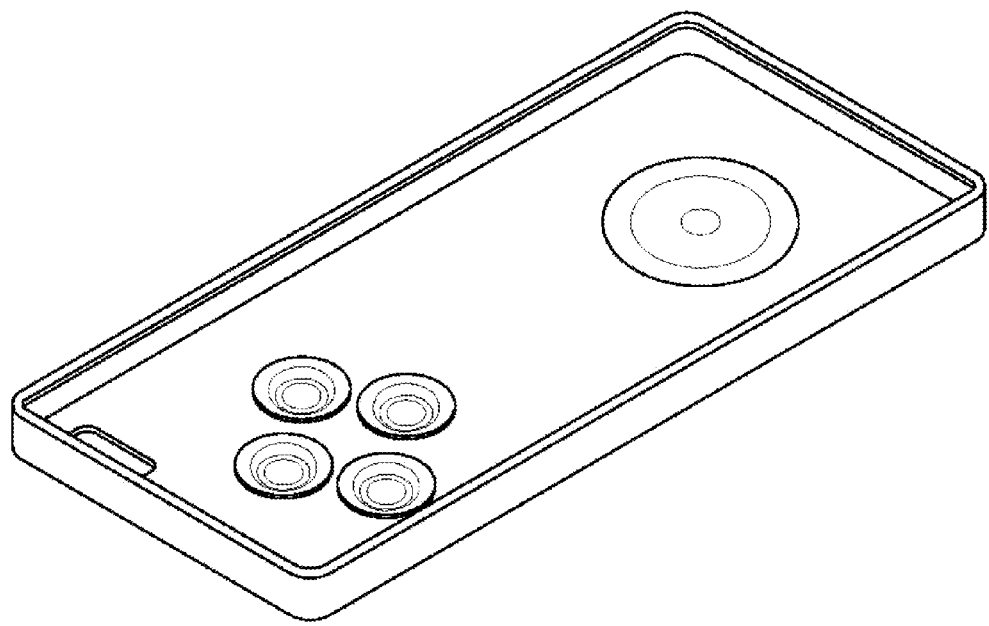
FIG. 21 is a perspective view showing the smartphone cover module with the embedded game controller according to another embodiment of the present invention when viewed from a rear.

In contrast, if the smartphone is connected to another display device such as a TV and the smartphone is used as the game pad, the smartphone cover may be manufactured in the form of the flip cover having no additional game display window as in another embodiment shown in FIGS. 20 and 21. In this case, it is possible to increase the size of the direction button and the selector button, so that a manipulation sensation is further improved.

It is understood by those skilled in the art that the foregoing description is a preferred embodiment and that various changes and modifications may be made in the invention without departing from the spirit and scope thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A smartphone cover module with an embedded game controller, comprising:
   a smartphone cover provided to protect a surface of a smartphone, with a through hole formed to expose the surface of the smartphone;
   a direction button formed on the through hole of the smartphone cover, and made of a conductive material;
   a direction-change support formed into a shape of a pole that extends downwards from a central portion of a lower surface of the direction button, and spacing the direction button apart from the surface of the smartphone; and a button restoring pad connecting the direction button or the direction-change support to the smartphone cover, and formed into a shape of a pad made of an elastic material, thus restoring the direction button from an inclined state to an original state, wherein, when a point on an upper surface of the direction button in a front-rear direction, a left-right direction, or a diagonal direction is pressed by an external force, the direction button is inclined with respect to the direction-change support and thereby transmits a direction signal to a point on the surface of the smartphone.

2. The smartphone cover module as set forth in claim 1, wherein the button restoring pad has the same shape as the through hole of the smartphone cover and is formed of a conductive material, an end thereof being connected to an inner surface of the through hole of the smartphone cover, a lower surface thereof being in close contact with the surface of the smartphone, and a central portion of an upper surface thereof being connected to a lower end of the direction-change support, thus elastically supporting an inclination of the direction-change support, the direction-change support is made of an insulating material and an elastic material and serves as a reference point for the inclination of the direction button on the upper surface of the button restoring pad, and the direction button is in contact with a point on the upper surface of the button restoring pad, thus transmitting the direction signal to the point on the surface of the smartphone.

3. The smartphone cover module as set forth in claim 1, wherein the button restoring pad is formed at a first end thereof along a side surface of the direction button and formed at a second end thereof along a side surface of the through hole of the smartphone cover, thus elastically supporting an inclination of the direction button, the direction-change support is made of an insulating material and a hard material, a lower end of the direction-change support being in contact with the surface of the smartphone cover, thus serving as a reference point for the inclination of the direction button, and the direction button is in direct contact with the point on the surface of the smartphone.

4. The smartphone cover module as set forth in claim 1, wherein the button restoring pad is made of a transparent material to expose the surface of the smartphone displaying a direction image to an outside.

5. The smartphone cover module as set forth in claim 1, wherein the direction button is formed into any one of a circular shape, an elliptical shape, a polygonal shape and a cross shape.

6. The smartphone cover module as set forth in claim 1, wherein the smartphone cover comprises, on a front surface thereof, the direction button and a selector button provided adjacent to the direction button; and comprises, on a rear surface thereof, a screen display window having the same size as a screen of the smartphone and exposing the screen to an outside, and at normal times, the rear surface of the smartphone cover is mounted to correspond to the screen provided on a front of the smartphone; while during a game, the front surface of the smartphone cover is mounted to correspond to the screen provided on the front of the smartphone.

7. The smartphone cover module as set forth in claim 6, further comprising:

a game display window provided on the front surface of the smartphone cover to expose the screen of the smartphone during the game.

8. The smartphone cover module as set forth in claim 1, wherein the smartphone cover comprises, on a front surface thereof, the direction button and a selector button provided adjacent to the direction button, the smartphone cover being formed into a shape of a flip cover that is rotatable at a front surface thereof.

9. The smartphone cover module as set forth in claim 8, further comprising:

a game display window provided on the front surface of the smartphone cover to expose the screen of the smartphone during the game.

10. A smartphone cover module with an embedded game controller, comprising:

a smartphone cover provided to protect a surface of a smartphone, with a through hole formed to expose the surface of the smartphone;

a direction button formed on the through hole of the smartphone cover to be movable in a front-rear direction, a left-right direction, or a diagonal direction;

a spacing support formed into a shape of a pole that extends downwards from a central portion of a lower surface of the direction button, and spacing the direction button apart from the surface of the smartphone;

a direction-change pad connected to a lower end of the spacing support, coming into contact with the surface of the smartphone, and moving on the surface of the smartphone in conjunction with a movement of the direction button; and a button restoring part provided on a side surface of any one of the direction button, the spacing support and the direction-change pad, and made of an elastic material, and restoring the direction button from a moved position to a center of the through hole of the smartphone cover, wherein the direction button, the spacing support, and the direction-change pad are made of a conductive material, so that, when a point on an upper surface of the direction button in the front-rear direction, the left-right direction, or the diagonal direction is pressed by an external force, the direction-change pad is moved in an associated direction and both a direction signal and an intensity signal are transmitted to a point on the surface of the smartphone.

11. The smartphone cover module as set forth in claim 10, wherein the button restoring part is formed at a first end thereof along a side surface of the direction-change pad and formed at a second end thereof along a side surface of the through hole of the smartphone cover, thus elastically supporting a movement of the direction-change pad.

12. The smartphone cover module as set forth in claim 10, wherein the button restoring part is formed at a first end thereof along a side surface of the spacing support and formed at a second end thereof along a side surface of the through hole of the smartphone cover, thus elastically supporting a movement of the direction-change pad.

13. The smartphone cover module as set forth in claim 10, wherein the button restoring part is made of an elastic material of either of a ring-shaped spring or a rubber band to surround side surfaces of the spacing support and the direction-change pad, and the through hole of the smartphone cover is provided with a locking protrusion that is downwardly bent, thus locking the button restoring part of the ring-shaped spring or the rubber band to a center of the through hole and thereby elastically supporting a movement of the direction-change pad.

14. The smartphone cover module as set forth in claim 10, wherein the direction-change pad is made of a transparent material to expose the surface of the smartphone displaying a direction image to an outside.

15. The smartphone cover module as set forth in claim 10, wherein the direction button is formed into any one of a circular shape, an elliptical shape, a polygonal shape and a cross shape.

16. The smartphone cover module as set forth in claim 10, wherein the smartphone cover comprises, on a front surface thereof, the direction button and a selector button provided adjacent to the direction button; and comprises, on a rear surface thereof, a screen display window having the same size as a screen of the smartphone and exposing the screen to an outside, and at normal times, the rear surface of the smartphone cover is mounted to correspond to the screen provided on a front of the smartphone; while during a game, the front surface of the smartphone cover is mounted to correspond to the screen provided on the front of the smartphone.

17. The smartphone cover module as set forth in claim 16, further comprising:

a game display window provided on the front surface of the smartphone cover to expose the screen of the smartphone during the game.

18. The smartphone cover module as set forth in claim 10, wherein the smartphone cover comprises, on a front surface thereof, the direction button and a selector button provided adjacent to the direction button, the smartphone cover being formed into a shape of a flip cover that is rotatable at a front surface thereof.

19. The smartphone cover module as set forth in claim 18, further comprising:

a game display window provided on the front surface of the smartphone cover to expose the screen of the smartphone during the game.

\* \* \* \* \*